United States Patent
Ott et al.

(10) Patent No.: US 10,737,363 B2
(45) Date of Patent: Aug. 11, 2020

(54) ADDITIVE MANUFACTURED CONGLOMERATED POWDER REMOVAL FROM INTERNAL PASSAGES

(71) Applicant: United Technologies Corporation, Farmington, CT (US)

(72) Inventors: Joe Ott, Enfield, CT (US); Wendell V. Twelves, Jr., Glastonbury, CT (US); Evan Butcher, Suffield, CT (US); Lexia Kironn, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/253,501

(22) Filed: Jan. 22, 2019

(65) Prior Publication Data

US 2019/0152012 A1 May 23, 2019

Related U.S. Application Data

(62) Division of application No. 14/946,884, filed on Nov. 20, 2015, now Pat. No. 10,220,444.

(51) Int. Cl.

| | |
|---|---|
| *B24B 5/06* | (2006.01) |
| *B22F 3/24* | (2006.01) |
| *B24B 1/04* | (2006.01) |
| *B24B 5/40* | (2006.01) |
| *B29C 64/35* | (2017.01) |
| *B33Y 40/00* | (2020.01) |

(Continued)

(52) U.S. Cl.
CPC .............. *B24B 5/06* (2013.01); *B22F 3/1055* (2013.01); *B22F 3/24* (2013.01); *B24B 1/04* (2013.01); *B24B 5/40* (2013.01); *B29C 64/35* (2017.08); *B33Y 40/00* (2014.12); *B22F 5/10* (2013.01); *B22F 2003/1059* (2013.01); *B22F 2003/247* (2013.01); *B22F 2999/00* (2013.01); *B33Y 10/00* (2014.12); *B33Y 30/00* (2014.12); *C04B 2235/6026* (2013.01); *C04B 2235/945* (2013.01); *Y02P 10/295* (2015.11)

(58) Field of Classification Search
None
See application file for complete search history.

(56) References Cited

U.S. PATENT DOCUMENTS

| 1,704,100 A | 3/1929 | Pike |
|---|---|---|
| 3,526,036 A | 9/1970 | Goof |

(Continued)

FOREIGN PATENT DOCUMENTS

| CN | 102913121 A | 2/2013 |
|---|---|---|
| DE | 3325525 A1 | 4/1984 |

(Continued)

OTHER PUBLICATIONS

EP Search Report dated May 15, 2017 issued for corresponding European Patent Application No. 16199684.8.

*Primary Examiner* — Monica A Huson
*Assistant Examiner* — Kelsey C Grace
(74) *Attorney, Agent, or Firm* — Bachman & LaPointe, P.C.

(57) ABSTRACT

A tool includes a flexible section; a head that extends form the flexible section; and an exciter within the head. A method of additively manufacturing a component including burrowing a tool into a conglomerated powder within an internal passage of an additively manufactured component, the tool vibrating in a manner to facilitate removal of the conglomerated powder.

6 Claims, 4 Drawing Sheets

(51) Int. Cl.
*B22F 3/105* (2006.01)
*B22F 5/10* (2006.01)
*B33Y 10/00* (2015.01)
*B33Y 30/00* (2015.01)

(56) References Cited

U.S. PATENT DOCUMENTS

| | | |
|---|---|---|
| 6,276,018 B1 | 8/2001 | Leiman et al. |
| 6,995,334 B1 | 2/2006 | Kovacevic et al. |
| 7,777,155 B2 | 8/2010 | Twelves, Jr. et al. |
| 8,383,985 B2 | 2/2013 | Twelves, Jr. et al. |
| 8,488,994 B2 | 7/2013 | Hanson et al. |
| 8,506,836 B2 | 8/2013 | Szuromi et al. |
| 8,695,264 B1 | 4/2014 | Blackburn et al. |
| 8,718,522 B2 | 5/2014 | Chillscyzn et al. |
| 8,879,957 B2 | 11/2014 | Hanson et al. |
| 8,961,167 B2 | 2/2015 | Swanson et al. |
| 8,985,497 B2 | 3/2015 | Mannella et al. |
| 8,994,592 B2 | 3/2015 | Scott et al. |
| 9,023,566 B2 | 5/2015 | Martin |
| 9,023,765 B1 | 5/2015 | Rimmer et al. |
| 9,029,058 B2 | 5/2015 | Martin |
| 9,039,917 B2 | 5/2015 | Szuromi et al. |
| 9,050,753 B2 | 6/2015 | Rodgers et al. |
| 9,050,788 B2 | 6/2015 | Swanson et al. |
| 9,073,263 B2 | 7/2015 | Mannella et al. |
| 9,079,803 B2 | 7/2015 | Xu |
| 9,114,478 B2 | 8/2015 | Scott et al. |
| 9,120,270 B2 | 9/2015 | Chen et al. |
| 2010/0147047 A1 | 6/2010 | Kerdiles et al. |
| 2012/0132310 A1 | 5/2012 | Cavaliere et al. |

FOREIGN PATENT DOCUMENTS

| | | |
|---|---|---|
| GB | 191013802 A | 10/1910 |
| GB | 569133 A | 5/1945 |
| GB | 2517490 | 2/2015 |
| JP | 2002011009 A | 1/2002 |

ADDITIVE MANUFACTURED CONGLOMERATED POWDER REMOVAL FROM INTERNAL PASSAGES

CROSS-REFERENCE TO RELATED APPLICATION

The instant application is a divisional application of U.S. patent application Ser. No. 14/946,884 filed Nov. 20, 2015.

BACKGROUND

The present disclosure relates to additive manufacturing and, more particularly, to removing conglomerated powder from within an internal passage.

Precision engineered parts such as gas turbine components may be manufactured by an additive manufacturing operation such that features associated with conventional manufacturing processes, e.g., machining, forging, welding, casting, etc. can be eliminated to facilitate savings in cost, material, and time. Additive manufacturing often results in conglomerated powder building-up around, and within, the completed component as an artifact of the process. When additive manufacturing a component that has internal passages, this conglomerated powder often becomes entrapped in the internal passages and is difficult to remove.

There are currently few methods that directly and rapidly remove the conglomerated powder. One standard practice may include repeated use of an accelerated media blast, combined with mechanically scraping. Another standard practice includes, mega sonic or ultrasonic vibratory methods to liberate the powder particles. Oftentimes, such practices are still inefficient at removal of removing conglomerated powder from within the internal passages.

Additively manufactured passages have a non-uniform roughness that varies both circumferentially as well as axially. The circumferential variation is a direct effect of layering nature of both a deposition and powder bed processes. The finish is finest on the bottom and progressively deteriorates towards the roof of the passage on horizontal passages with respect to the layered deposition process, while vertical passages will have a relatively uniform finish. In addition, the Electron Beam Melting additive process partially sinters material in the formed passage making powder removal difficult in such passages.

SUMMARY

A tool according to one disclosed non-limiting embodiment of the present disclosure can include a flexible section; a head that extends from the flexible section; and an exciter within the head.

A further embodiment of the present disclosure may include an abrasive material on the head.

A further embodiment of the present disclosure may include, wherein the exciter is at least one of an ultrasonic, piezo, hydraulic, and pneumatic exciter.

A further embodiment of the present disclosure may include at least one groove within an outer diameter of the flexible section.

A further embodiment of the present disclosure may include, wherein the at least one groove spirals around the outer diameter of the flexible section.

A further embodiment of the present disclosure may include a lubrication passage through the flexible section to excrete a lubricant from the head.

A further embodiment of the present disclosure may include, wherein the flexible section is rotatable.

A method of additively manufacturing a component according to another disclosed non-limiting embodiment of the present disclosure can include burrowing a tool into conglomerated powder within an internal passage of an additively manufactured component, the tool vibrating in a manner to facilitate removal of the conglomerated powder.

A further embodiment of the present disclosure may include cleaning the internal passage of the conglomerated powder with the tool subsequent to completion of the additively manufactured component.

A further embodiment of the present disclosure may include abrading the local surface of the internal passage to provide a desired uniform surface finish.

A further embodiment of the present disclosure may include abrading a local surface of the internal passage with an abrasive on the tool to provide a desired uniform surface finish.

A further embodiment of the present disclosure may include rotating the tool within the internal passage.

A further embodiment of the present disclosure may include transporting the conglomerated powder out of the internal passage along spiral grooves in the tool.

A further embodiment of the present disclosure may include transporting the conglomerated powder out of the internal passage along grooves in the tool.

A further embodiment of the present disclosure may include discharging a lubricant from the tool.

A further embodiment of the present disclosure may include adjusting an amplitude and frequency of the exciter to vibrate the tool in a manner to provide relatively uniform radial contact within the internal passage.

A further embodiment of the present disclosure may include, wherein the internal passage defines an aspect ratio with a diameter to length of less that 1:4.

A further embodiment of the present disclosure may include, wherein the internal passage is a non-line of sight passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
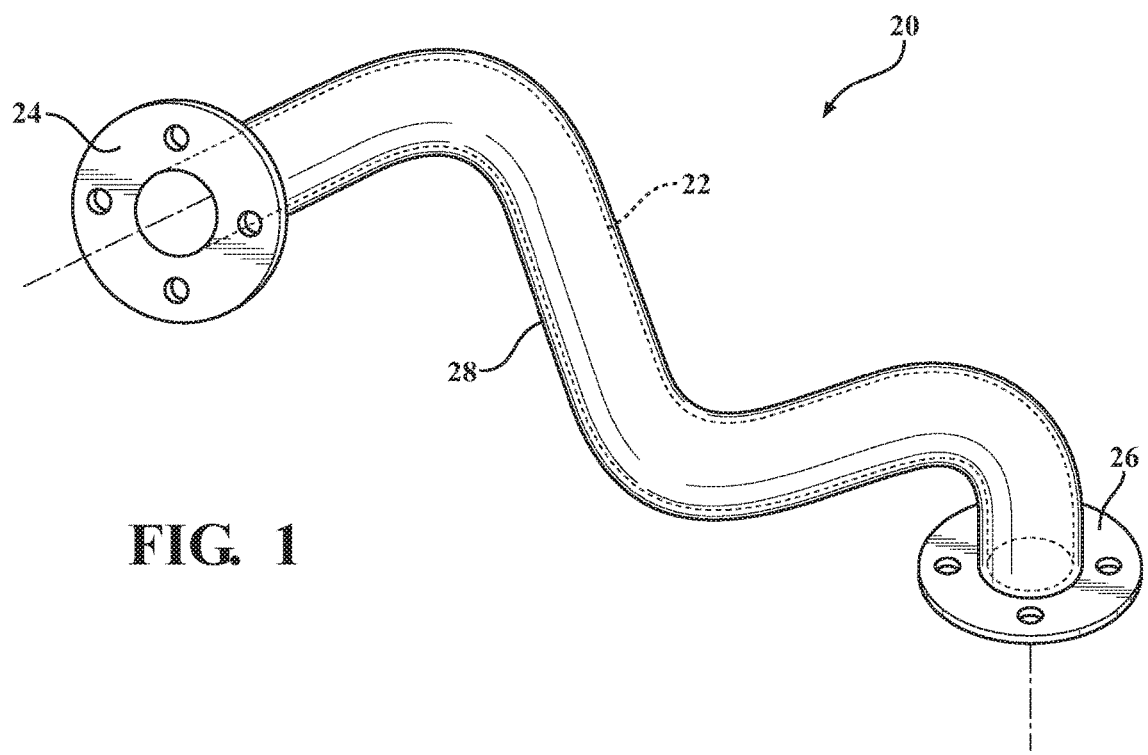
FIG. 1 is a perspective view of a representative additively manufactured component.

FIG. 1 schematically illustrates a component 20 that includes an internal passage 22. In this example, the component 20 may be a conduit such as that of a manifold, duct, flow passage, or other such component. The component 20 may include a first flange 24, a second flange 26, and a conduit 28 with the internal passage 22 therebetween. The internal passage 22 may be complex and be of a non-line of sight geometry that includes multiple bends. It should be appreciated that various additional or alternative segments and/or fittings may also be provided. It should be further appreciated that although a conduit type example is illustrated herein, other aerospace components, aircraft structures, as well as a wide variety of applications outside the aerospace industry, which include relatively weak partially sintered metallic powder found inside deep recesses, holes, passages, and internal cavities will benefit herefrom.

The component 20 may be readily manufactured with an additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Laser Powder Bed Fusion (LPBF) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

The additive manufacturing process fabricates or "grows" of components using three-dimensional information, for example a three-dimensional computer model. The three-dimensional information is converted into a plurality of slices, each slice defining a cross section of the component for a predetermined height of the slice. The additive manufactured component 20 is then "grown" slice-by-slice, or layer-by-layer, until finished. Each layer has an example size between about 0.0005-0.001 inches (0.0127-0.0254 mm). The additive manufacturing process facilitates manufacture of the relatively complex internal passage geometry to minimize assembly details, gun-drilling, and multi-component construction.

In one example, the internal passage 22 may define an aspect ratio with a diameter to length of less that 1:4 and may be a non-line of sight, e.g., non-straight passage. In this non-limiting dimension embodiment, the internal diameter 22D dimension of the internal passage 22 is between about 0.25 and 2.0 inches (about 6-50 mm) in diameter. It should be appreciated that this is but one example, and various relationship may otherwise benefit herefrom.

Figure 2:
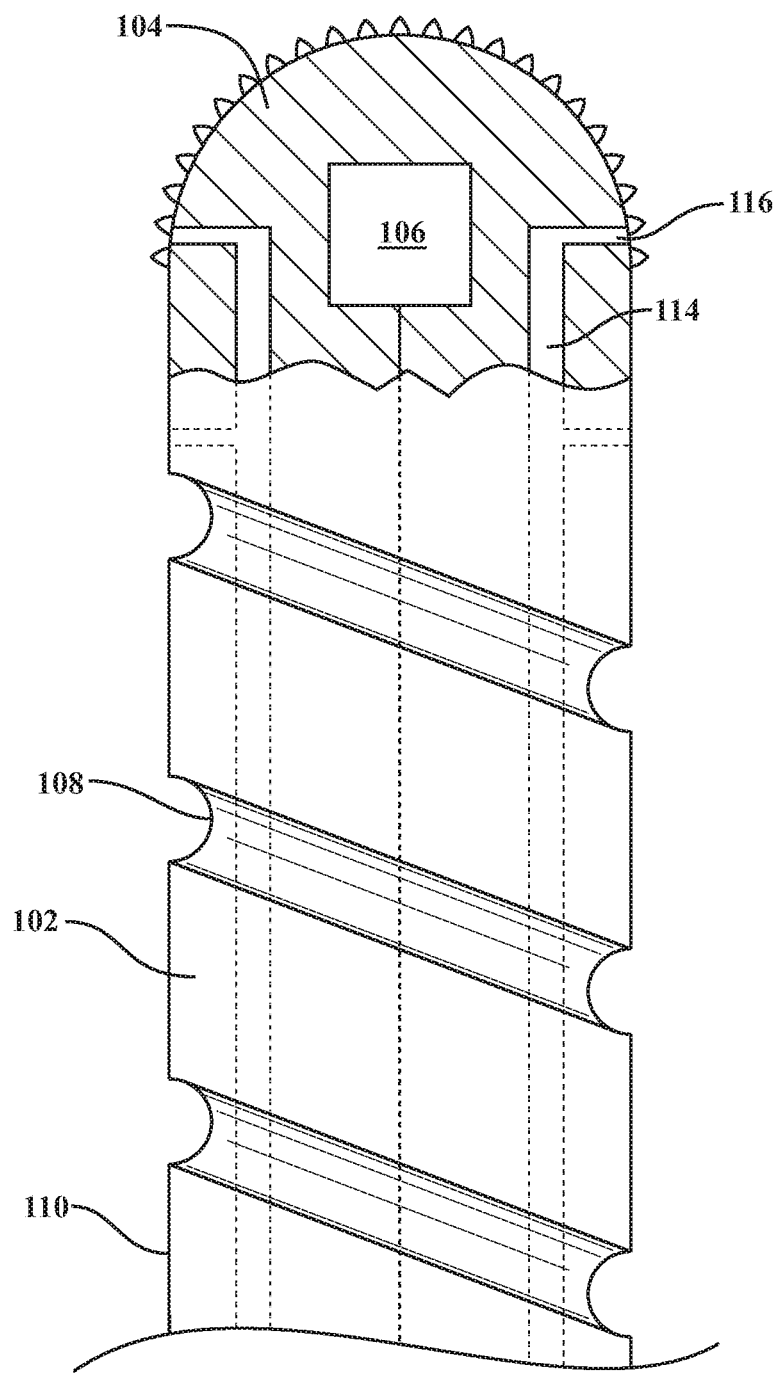
FIG. 2 is an expanded head view of the tool according to one disclosed non-limiting embodiment.

With reference to FIG. 2, a tool 100, according to one disclosed non-limiting embodiment, is schematically illustrated. The tool 100 operates as an abrasive "worm" to surface finish a passage such as the internal passage 22 and to remove partially sintered non-line of sight material blocking or conglomerated powder the internal passage 22. The tool generally includes a flexible section 102, a head 104, and an exciter 106. The flexible section 102 originates with the head 104 and may be sized to the particular internal passage 22 to provide the desired diameter thereof. That is, the diameter of the flexible section 102 provides a desired surface finish to the internal passage 22. The size (diameter, length) of the tool 100 may also be readily scaled to conform with conventional metric or standard hole diameters or custom built to a desired diameter and length.

Figure 3:
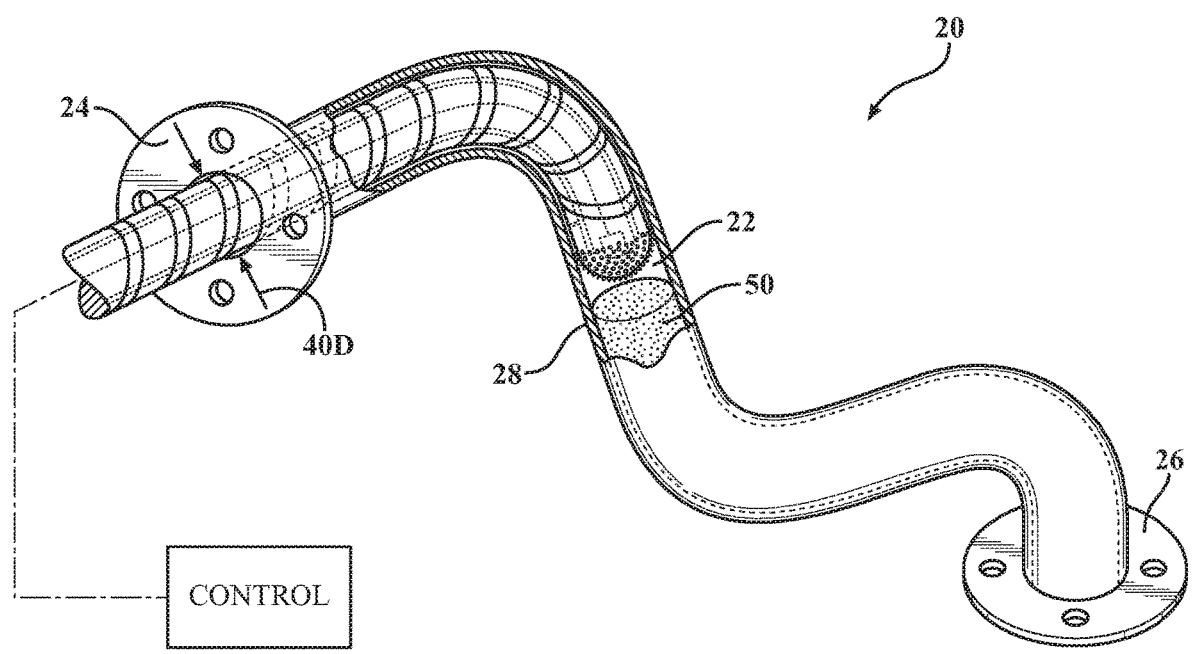
FIG. 3 is a perspective view of the additively manufactured component of FIG. 1 with a tool according to one disclosed non-limiting embodiment for removing conglomerated powder from within the internal passage.

The exciter 106 may include, for example, an ultrasonic, piezo, hydraulic, pneumatic, etc., that can be adjusted for amplitude and frequency to cause the head 104 to vibrate in a manner to provide relatively uniform radial contact within the passage 22 (FIG. 3). The head 104 may be coated with a soft or hard abrasive 112 as required by the necessary finish and parent additive manufacturing material. The abrasive 112 facilitates abrasion of the local surfaces of the passage 22 generated by the exciter 106 to provide a desired uniform radial finish.

A positive force can be applied to the tool 100 to translate the tool 100 through the passage 22 to surface finish the inner diameter of the internal passage 22. A user may manually apply the positive force or such force may be computer controlled and automated. The fully sintered outer diameter wall of the internal passage 22 encapsulates the tool 100 to self-guide along the internal passage 22.

The flexible section 102 may include grooves 108 that spiral, or otherwise extend around and/or along an outer diameter 110 of the flexible section 102. The grooves 108 facilitate the transition of liberated material out of the passage 22, similar to how material travels up the grooves in a drill. In another disclosed non-limiting embodiment, the flexible section 102 may be driven in a rotary manner. The rotary motion may be continuous or oscillatory in nature to further smooth the passage 22 as the tool 100 "burrows" through the partially sintered powder that is trapped in the passage 22. To facilitate such "burrowing," a lubricant passage 114 may be formed within the flexible section 102 and the head 104 to excrete, spray, or otherwise supply a lubricant through one or more openings 116.

The tool 100 facilitates a uniform surface finish throughout an additively manufactured passage as well as removes material from passage such as waste finish material and sintered material. The tool 100 may also be tailored to each passage 22 for material removal and surface finish by adjusting amplitude, frequency, speed of translation through the passage, and abrasive media. The tool 100 is scalable and may permit hone/finish passage operations to a desired final diameter and target surface finish.

Figure 4:
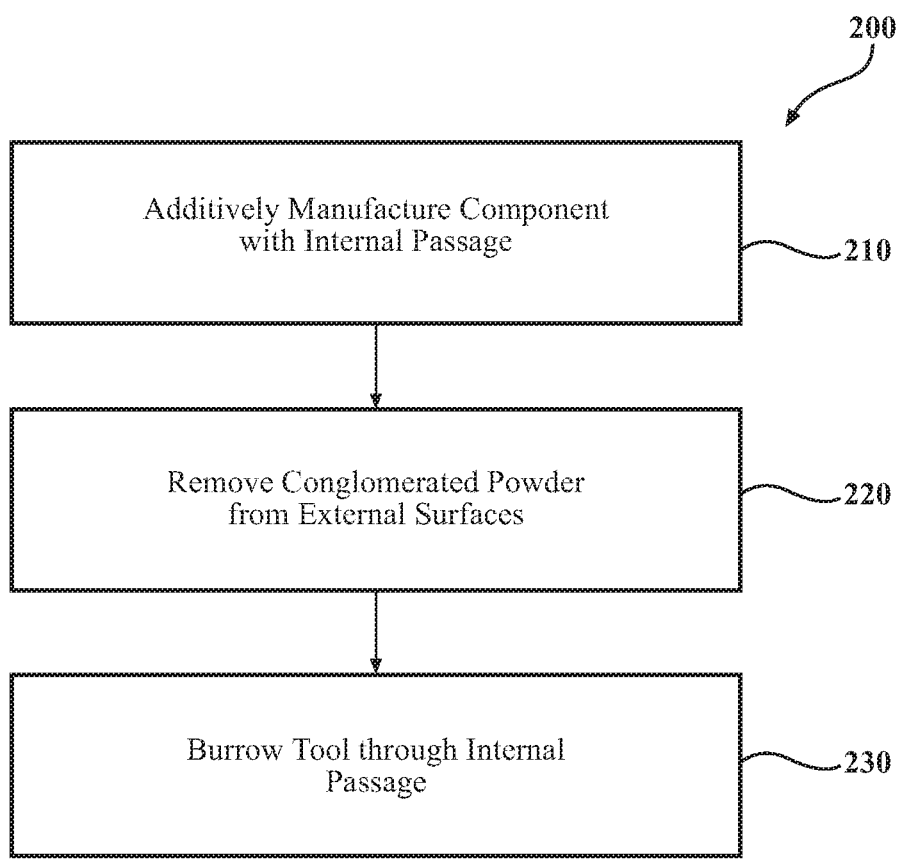
FIG. 4 is a method of additively manufacturing a component according to one disclosed non-limiting embodiment.

With reference to FIG. 4, one disclosed non-limiting embodiment of a method 200 to additively manufacture the component 20 initially includes additively manufacturing the component 20 with an internal passage 22 (step 210). The internal passage 22 is often a non-line of sight passage.

Figure 5:
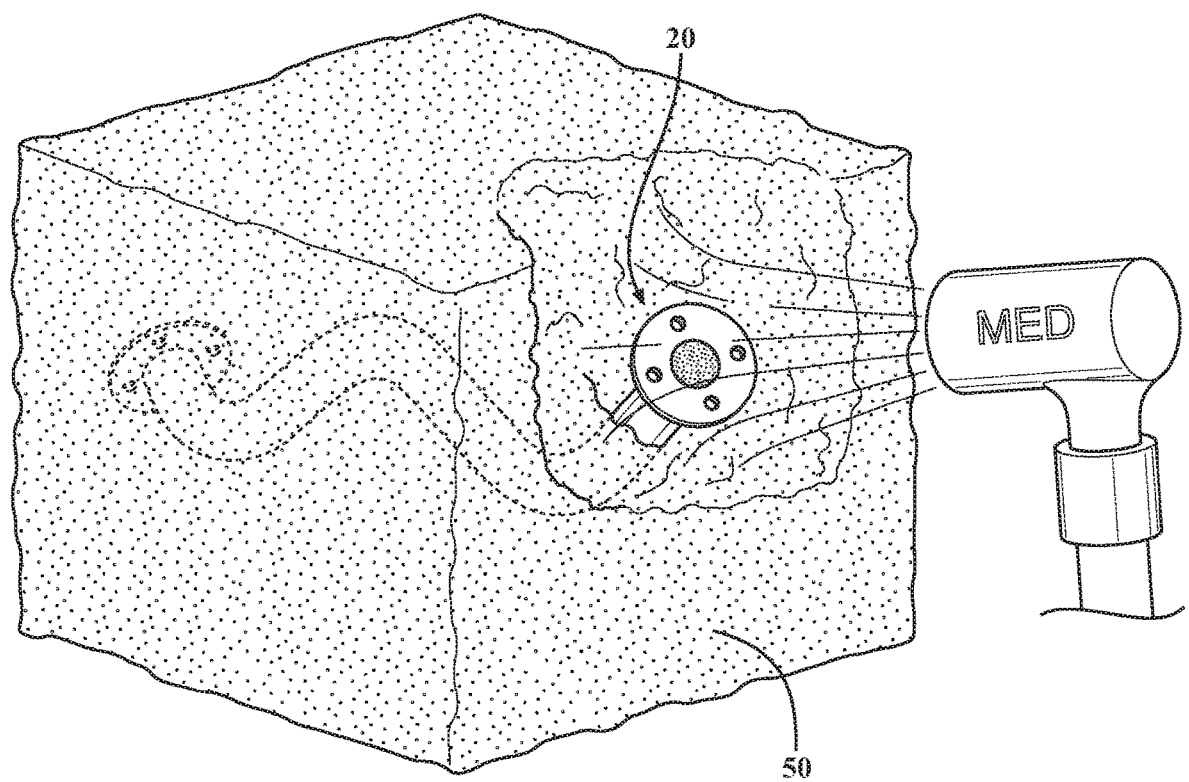
FIG. 5 is a perspective view of one step in the method of additively manufacturing a component.

Next, conglomerated powder 50 is removed from the external surfaces of the completed additively manufactured component 20 (step 220; FIG. 5). Removal is conventional and may include the use of accelerated media blast, mechanically scraping, vibratory or other methods.

Next, the tool 100 is burrowed into the internal passage 22 to mechanically work the conglomerated powder 50 out of the internal passage 22 (step 230). That is, the conglomerated powder 50 may be relatively compacted and the tool 100 operates to clean the internal passage 22 of the conglomerated powder 50. As described above, a positive force and/or rotation can be applied to the tool 100 to translate the tool 100 through the passage 22 to remove the conglomerated powder and surface finish the inner diameter of the internal passage 22. Further, the exciter 106 may be adjusted for amplitude and frequency to cause the head 104 to vibrate in a manner to provide relatively uniform radial contact within the passage 22.

The utilization of the tool 100 readily facilitates direct and rapid removal of the conglomerated powder from within internal passages.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A tool, comprising:
    a flexible section with at least one groove within an outer diameter of the flexible section;
    a head that extends from the flexible section; and
    an exciter within the head, the tool vibrating in a manner to facilitate removal of a conglomerated powder.

2. The tool as recited in claim 1, further comprising an abrasive material on the head.

3. The tool as recited in claim 1, wherein the exciter is at least one of an ultrasonic, piezo, hydraulic, and pneumatic exciter.

4. The tool as recited in claim 1, wherein the at least one groove spirals around the outer diameter of the flexible section.

5. The tool as recited in claim 1, further comprises a lubrication passage through the flexible section to excrete a lubricant from the head.

6. The tool as recited in claim 1, wherein the flexible section is rotatable.

* * * * *